US011276165B2

(12) United States Patent
Thagaard et al.

(10) Patent No.: US 11,276,165 B2
(45) Date of Patent: Mar. 15, 2022

(54) METHOD FOR TRAINING A DEEP LEARNING MODEL TO OBTAIN HISTOPATHOLOGICAL INFORMATION FROM IMAGES

(71) Applicant: Visiopharm A/S, Horsholm (DK)

(72) Inventors: Jeppe Thagaard, Copenhagen (DK); Johan Dore Hansen, Naerum (DK); Thomas Ebstrup, Jyllinge (DK); Michael Friis Lippert, Vaerlose (DK); Michael Grunkin, Skodsborg (DK)

(73) Assignee: Visiopharm A/S, Horsholm (DK)

( * ) Notice: Subject to any disclaimer, the term of this patent is extended or adjusted under 35 U.S.C. 154(b) by 82 days.

(21) Appl. No.: 16/622,453

(22) PCT Filed: Jun. 12, 2018

(86) PCT No.: PCT/EP2018/065504
§ 371 (c)(1),
(2) Date: Dec. 13, 2019

(87) PCT Pub. No.: WO2018/229052
PCT Pub. Date: Dec. 20, 2018

(65) Prior Publication Data
US 2021/0150701 A1    May 20, 2021

(30) Foreign Application Priority Data
Jun. 15, 2017   (EP) .................... 17176214

(51) Int. Cl.
*G06T 7/00* (2017.01)
*G06T 7/33* (2017.01)
(Continued)

(52) U.S. Cl.
CPC ............. *G06T 7/0012* (2013.01); *G01N 1/30* (2013.01); *G06K 9/3216* (2013.01); *G06T 7/33* (2017.01);
(Continued)

(58) Field of Classification Search
CPC .................... G06T 7/0012; G06T 7/33; G06T 2207/20081; G06T 2207/30024;
(Continued)

(56) References Cited

U.S. PATENT DOCUMENTS

2010/0215227 A1* 8/2010 Grunkin ................ G06T 7/0012
382/128
2012/0076390 A1* 3/2012 Potts ........................ G06T 7/38
382/133

(Continued)

FOREIGN PATENT DOCUMENTS

| WO | 2008080403 A1 | 7/2008 |
| WO | 2015049233 A1 | 4/2015 |
| WO | 2018001689 A1 | 1/2018 |

OTHER PUBLICATIONS

Turkki et al. "Antibody-Supervised Deep Learning for Quantification of Tumor-Infiltrating Immune Cells in Hematoxylin and Eosin Stained Breast Cancer Samples." Journal of Pathology Informatics, 1:38, Sep. 1, 2016, 9 pages (Year: 2016).*

(Continued)

*Primary Examiner* — Jon Chang
(74) *Attorney, Agent, or Firm* — Dinsmore & Shohl LLP

(57) ABSTRACT

A method and a system for training a deep learning model to obtain histopathological information from images.

12 Claims, 6 Drawing Sheets

(51) Int. Cl.
   *G01N 1/30* (2006.01)
   *G06K 9/32* (2006.01)
(52) U.S. Cl.
   CPC ............... *G06K 2209/05* (2013.01); *G06T 2207/20081* (2013.01); *G06T 2207/30024* (2013.01)
(58) Field of Classification Search
   CPC ............ G06K 9/3216; G06K 2209/05; G06K 9/6259; G06K 9/00147; G01N 1/30
   See application file for complete search history.

(56) References Cited

U.S. PATENT DOCUMENTS

2016/0321809 A1* 11/2016 Chukka ................ G06K 9/0014
2019/0392578 A1* 12/2019 Chukka .............. G06K 9/00147

OTHER PUBLICATIONS

Jain, A.K. et al. Artificial neural networks: a tutorial, computer, vol. 29, No. 3, Mar. 1, 1996 pp. 31-44, XP055421356.
Lisa Gottesfeld Brown; "A survey of image registration techniques" ACM Computing Surveys vol. 24, No. 4, Dec. 1, 1992, pp. 325-376, XP055424351.
International Search Report dated Sep. 3, 2018, International Application No. PCT/EP2018/065504.
Turkki, R. et al. "Antibody-supervised deep learning for quantification of tumor-infiltrating immune cells in hematoxylin and eosin stained breast cancer samples" Journal of Pathology Informatics, 2016; Obtained from the Internet, URL: http://www.jpathinformatics. org on Apr. 26, 2017.
"Contextvision files new patent for digital pathology" press release dated Jun. 29, 2016.

* cited by examiner

METHOD FOR TRAINING A DEEP LEARNING MODEL TO OBTAIN HISTOPATHOLOGICAL INFORMATION FROM IMAGES

This application is the U.S. national stage of PCT/EP2018/065504 filed Jun. 12, 2018, which claims priority of European Patent Application 17176214.9 filed Jun. 15, 2017 of which is hereby incorporated by reference in its entirety.

The present disclosure relates to a method and system for training a deep learning model to obtain histopathological information from images, and to a deep learning trained to obtain histopathological information from images.

BACKGROUND OF INVENTION

Deep learning (DL) models, such as convolutional neural networks (CNN), recurrent neural networks (RNN), generaltive adversarial networks (GAN) etc., have the possibilities of revolutionizing medical imaging as they can utilize the vast amount of data produced in the healthcare sector. Pathology departments are no exception. Large amount of digital image data of histopathology tissue sections is produced. Deep learning is a branch of machine learning based on a set of algorithms that attempt to model high-level abstractions in data by using multiple processing layers with complex structures. Various deep learning architectures are used in fields such as computer vision, automatic speech recognition, natural language processing, audio recognition, and bioinformatics. Pattern recognition systems may employ classifiers that utilize deep learning architectures to generate decisions for a set of input data. The classifiers may utilize algorithms that are structured in the form of a deep learning architecture, such as a convolutional neural network, which includes various combinations of layers to arrive at a decision.

If we want to take advantage of the datasets, for example by involving deep learning techniques, there is usually a need to involve human experts, such as pathologists, to enrich the raw images data with for example high-level information (e.g. patient outcome) and low-level information (e.g. ground truth labelling).

Ground truth labelling is the process in which human specialists mark, classify or outline specific objects or areas in the images. In histopathology, this ranges from cell nuclei marking to cancerous tissue outlining; all done manually by hand using digital tools. Such tasks are not only time-consuming, but are also prone to human subjectivity and inter-annotator variability. The latter is shown to be large as 40% on the same sample. If proper ground truth annotations from human experts cannot be obtained because the task is too time-consuming or not reliable, useful deep learning models cannot be developed. If ground truth annotations can be obtained from a panel of human experts, the model must account for the variation and subjectivity. There are other steps than the labelling step itself that make an objective labelling difficult. FIG. 4 shows a number of steps from the extraction of a sample to the analysis of images. Each step in the sample preparation includes sources of variation.

In order to overcome the issues associated with manual annotation, there have previously been attempts to improve the annotation and to develop more advanced staining methods and protocols. These staining methods, for example involving immunohistochemistry (IHC), are sometimes more accurate in obtaining histopathological information, but also more expensive and cannot always be used. The development of successful deep learning models relies on proper ground truth labelling process—there is thus a need to improve the labelling process by overcoming the challenges related to variation and subjectivity, in particular when using cheaper and less accurate staining methods, or staining enabling less histopathological information.

SUMMARY OF INVENTION

Accordingly, it is an object of the present invention to overcome the above mentioned challenges. The present disclosure relates to a method for training a deep learning model to obtain histopathological information from images, the method comprising the steps of:
  providing a first image of a first section of a specimen, such as a tissue portion, wherein the first section has been stained using a first staining protocol;
  providing a second image of a second section of the specimen, the first and second sections being adjacent sections of the specimen, wherein the second section has been stained using a second staining protocol different from the first staining protocol;
  co-registration of the first and second sections of the images;
  obtaining histopathological information for the first section of the first image based on the staining of the first section and the first staining protocol;
  transferring the histopathological information for the first section of the first image to the second section of the second image based on the co-registration of the first and second sections, thereby labelling the second image according to the histopathological information of the first image; and
  training a deep learning model, based on the labelling of the second image, to obtain histopathological information from images stained with the second staining protocol.

The first staining protocol may in particular be an IHC staining protocol or an immunofluorescence (IF) staining protocol and the second protocol may be a hematoxylin and eosin (H&E) staining protocol, which is cheaper than IHC and often the gold standard for diagnostic purposes, but does not provide the same specific immunohistochemistry (IHC)-based staining information. The step of obtaining histopathological information for the first section of the first image is preferably carried out in an automatic process based on image processing. The present disclosure therefore relates to a method in which a deep learning model, in one embodiment, is trained to recognize specific IHC-expressions (e.g. tumor regions, mitotic cells etc.) in H&E-stained tissue samples without requiring the more expensive IHC-stained sections. The trained model can thus be applied to e.g. H&E-stained tissue samples. The inventors have surprisingly found that although the method depends on staining of two different and adjacent sections of the specimen using different staining protocols it is still possible to obtain an efficient training of the deep learning model.

The presently disclosed method may therefore be useful for transferring information between images of adjacent sections of a sample from expensive IHC-stains or immunofluorescence (IF) stains to less expensive histological stains (for example H&E) in a co-registration process. The co-registration process may be an automatically scalable registration process. It has been found that the co-registration of differently stained adjacent tissue sections can be used to train a deep learning model to recognize specific IHC information or immunofluorescence (IF), e.g. tumor regions, in a different type of staining protocol, typically an H&E protocol. The deep learning method is thereby trained to obtain histopathological information from an image of a section of a specimen based on hematoxylin and eosin (H&E) staining, by recognizing specific immunohistochemistry (IHC)-based staining information or immunofluorescence (IF)-based staining information, such as tumor regions. The training may be based on a hematoxylin and eosin-stained first training image labelled according to histopathological information of an immunohistochemistry-stained second training image. If a deep learning model is trained to recognize IHC-expressions (e.g. tumor regions, mitotic cells etc.) in H&E-stained tissue samples, the developed algorithms of the model can then be deployed on H&E-stained sections only, without requiring more expensive IHC-stained sections, but nonetheless benefitting of recognizing the IHC-expressions.

The provision of the two adjacent images having different staining can be serial adjacent sectioning of a tissue block, wherein adjacent sections are processed with different staining protocols, e.g. one with H&E and another with IHC, e.g. PCK. The co-registration of the first and second sections of the images can be performed for example on a cellular level and/or using multi-scale point-matching and local deformations. The co-registration may use feature-based registration techniques, which may match local deformations between adjacent tissue sections. By using the co-registration algorithm, the same level of information as in the IHC staining can be transferred to the second image and can thereby be used to label the second image according to the histopathological information of the first image, i.e. a more accurate labelling. The training of the deep learning model can be said to use co-registration of differently stained serial tissue sections, hence in an automated manner obtaining ground truth annotations or labelling for supervised training of deep learning algorithms. Supervised training refers to learning a function from labelled training data. The training data consists of a set of training examples (images, part of images, pixels etc.) and a corresponding output value (ground truth label). The deep learning model can be trained on training annotations from the second image and the corresponding output value of the image analysis results of the first image. The more accurate IHC and/or immunofluorescence (IF) information may provide sufficiently accurate image annotation to base the training of the deep learning models on. The labelling and training are not subject to human subjectivity and intra-annotator variability but only based on the IHC-expression. Training of DL models may then involve the step of recognizing specific IHC and/or IF information, e.g. tumor regions, in a different type of staining protocol, e.g. H&E. The method has several advantages: there is no longer a need for specialists to perform the task of ground truth labelling and the obtained labelling is more accurate. The method can also be applied to existing data from clinical centers and/or implemented in existing workflows with existing staining protocols.

The present disclosure further relates to a system configured to obtain histopathological information from a hematoxylin and eosin stained image of a section of a specimen using a deep learning model trained according to the presently disclosed method for training a deep learning model to obtain histopathological information from images.

These and other aspects of the invention are set forth in the following detailed description of the invention.

DESCRIPTION OF DRAWINGS

The drawings are exemplary and are intended to illustrate some of the features of the presently disclosed method for labelling of histopathological images, and are not to be construed as limiting to the presently disclosed invention.

DETAILED DESCRIPTION OF THE INVENTION

Figure 2:
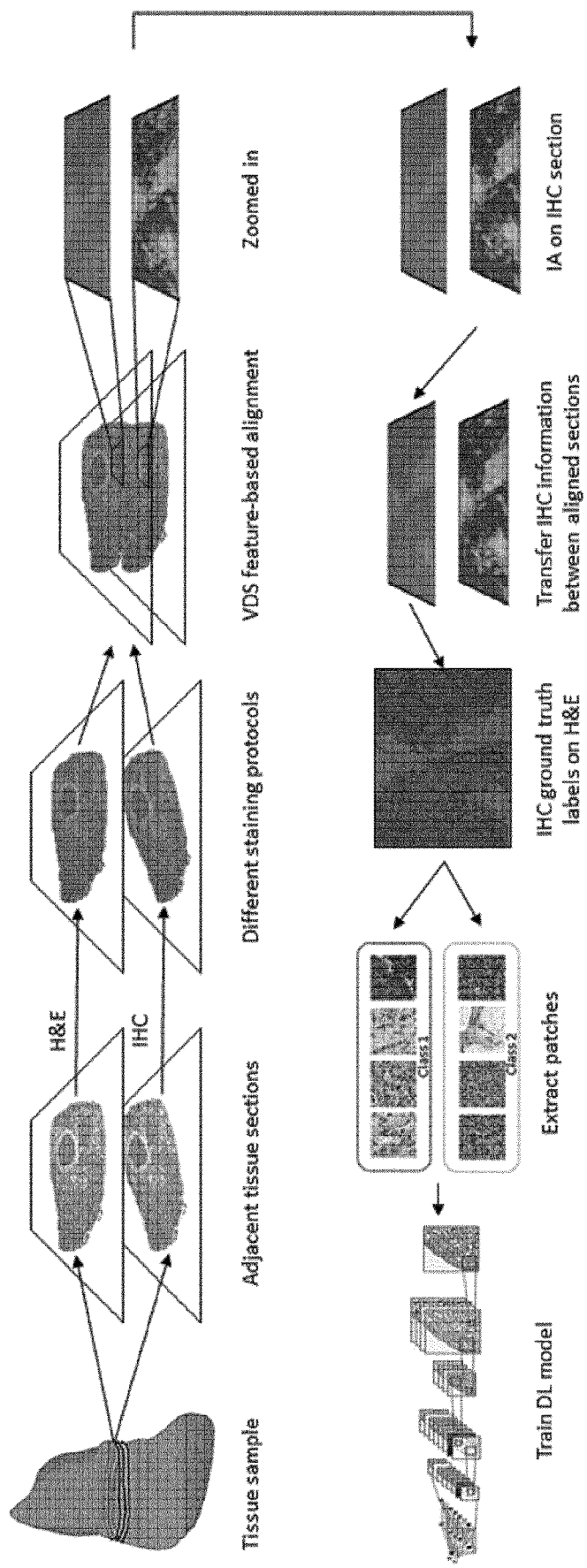
FIG. 2 shows a process of automatic labelling of histopathological images for training a deep learning model.

The present disclosure relates to a method for labelling of histopathological images, which may be used for training a deep learning model. The disclosure can thereby also be considered to present a method for training a deep learning model of computer vision in relation to digital pathology using co-registration of differently stained adjacent sections of a specimen. The method comprises the steps of: providing a first image of a first section of a specimen, such as a tissue portion, wherein the first section has been stained using a first staining protocol; and providing a second image of a second section of the specimen. Preferably, the first and second sections are adjacent sections of the specimen, wherein the second section has been stained using a second staining protocol different from the first staining protocol. The method may further comprise the step of aligning the images of the first and second sections using co-registration. This may be achieved for example by co-registration on a cellular level. The co-registration may also be based on for example multi-scale point-matching and local deformations. The first image will typically comprise histopathological information, such as outlined areas representing cancerous tumor regions or mitotic cells, but could comprise any annotation. The histopathological information from the first image may typically be IHC information. The method may further comprise the step of transferring said histopathological information for the first image of the first section to the second image of the second section based on the co-registration of the first and second sections, thereby labelling the second image according to the histopathological information of the first image. In particular, the histopathological information of the first section may be a result of automatic image analysis. The method may further comprise the step of training a deep learning model to obtain histopathological information from images. FIG. 2 shows a process of automatic labelling of histopathological images for training a deep learning model.

Figure 5A:
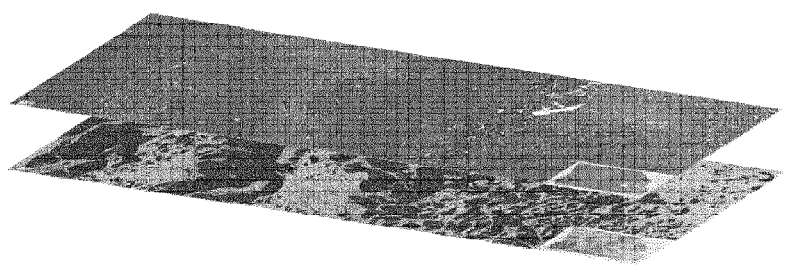
FIG. 5A-B show two adjacent tissue sections stained using different staining protocols (5A) and annotations for the two adjacent tissue sections (5B) obtained by applying the presently disclosed method for labelling of histopathological images.

The labelling may be ground truth labelling. Under the assumption that the histopathological information for the first image of the first section provides a ground truth labelled image, the obtained second image may accordingly be seen as a ground truth labelled image after proper co-registration. Annotation and labelling can be seen as indications in the images pointing out physical characteristics. The labelling associated with the images is important for building proper models. Examples of annotations can be seen in FIGS. 5A and 5B.

Therefore, the present disclosure further relates to a method for training a deep learning model, such as a convolutional neural network, a recurrent neural network or a general adversarial network, to obtain histopathological information from an image of a section of a specimen based on a first staining, by recognizing specific staining information, such as tumor regions, based on a second staining protocol different from the first staining protocol, from the image, wherein said training is based on co-registration of a first training image and a second training image, wherein the first and second training images represent adjacent tissue sections stained using the first and second staining protocol respectively. In particular, the model may be trained to obtain the histopathological information by recognizing specific immunohistochemistry (IHC)-based or immunofluorescence (IF)-based staining information from the image, wherein said training is based on a hematoxylin and eosin-stained first training image and a second immunohistochemistry-stained or immunofluorescence-stained training image. The hematoxylin and eosin-stained first training images may be labelled, preferably automatically labelled using image analysis algorithms, according to histopathological information of immunohistochemistry-stained training images. In one embodiment, the method for training a deep learning model, such as a convolutional neural network, a recurrent neural network or a general adversarial network, to obtain histopathological information from an image of a section of a specimen based on hematoxylin and eosin (H&E) staining, by recognizing specific immunohistochemistry (IHC)-based staining information or immunofluorescence (IF), such as tumor regions, from the image, is based on a hematoxylin and eosin-stained first training image labelled according to histopathological information of an immunohistochemistry-stained second training image. The trained deep learning model can then be used for diagnosing and/or classifying cancer from an image of a section of a specimen based on hematoxylin and eosin (H&E) staining. The diagnosing and/or classifying process may be implemented as part of any computer program or system, for example as a system for diagnosing and/or classifying cancer from an image of a section of a specimen based on hematoxylin and eosin (H&E) staining, said system comprising a computer-readable storage device for storing instructions that, when executed by a processor, performs the presently disclosed method for diagnosing and/or classifying cancer.

The method may further comprise the step of training a deep learning model based on the labelling of the second image. Such training may be based on training annotations associated with the second image, wherein results of the training annotations are compared against the histopathological information of the second image. The deep learning model is thereby trained to recognize specific IHC information, e.g. tumor regions, in an H&E protocol. The deep learning method can be considered to be trained to obtain histopathological information from an image of a section of a specimen based on hematoxylin and eosin (H&E) staining, by recognizing specific immunohistochemistry (IHC)-based staining information, such as tumor regions. In particular, it is useful when the first staining protocol is more specific and/or more reliable, or provides additional information or more accurate information than the second staining protocol. In one embodiment of the training, it is assumed that the first staining protocol provides a true labelling. Specifically, the staining of the first section is immunohistochemistry (IHC) and the staining of the second section is hematoxylin and eosin (H&E). Hence, the labelled second images may, in a further step, are used for training a deep learning model to obtain histopathological information from an image of a section of a specimen based on hematoxylin and eosin (H&E) staining, by recognizing specific immunohistochemistry (IHC)-based staining information. The deep learning model may thereby be trained to recognize expressions, such as tumor regions and/or mitotic cells, associated with the histopathological information of the first section, in images stained with the second staining protocol. More specifically, the deep learning model may be trained to recognize specific immunohistochemistry information in hematoxylin and eosin stained images.

The labelling and training methods can also be applied both to existing data from e.g. clinical centers and/or implemented in existing workflows with existing staining and analysis processes. The actual step of serial adjacent sectioning to obtain the first and second sections may or may not be part of the sequence, and the same is valid for the step of staining the first and second sections, using different staining protocols. The step of training a deep learning can be added as an additional step after the labelling process described in the present disclosure.

Figure 6:
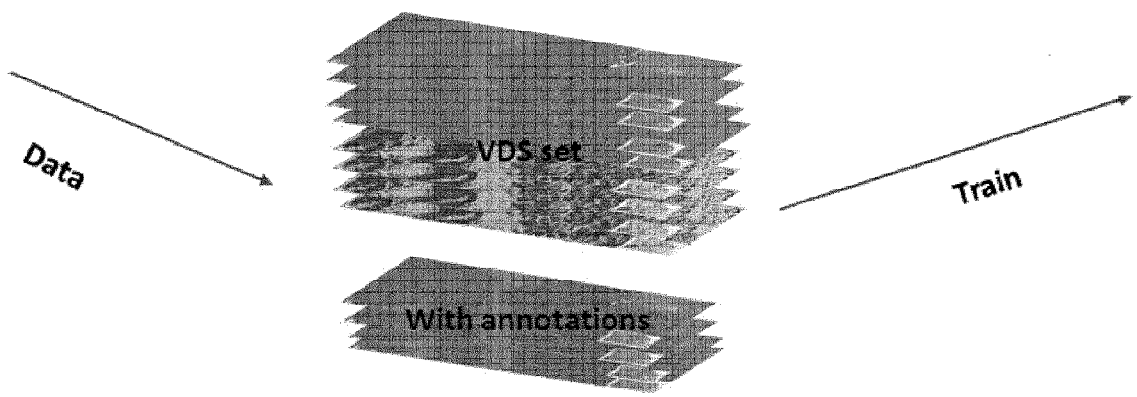
FIG. 6 shows a number of tissue sections which have been annotated using the presently disclosed method for labelling of histopathological images repeatedly.

In one embodiment, the steps of the labelling procedure are repeated for a number of specimens, thereby generating a database of ground truth annotated datasets, as shown in FIG. 6. The database of annotated data sets may then, in a further step, be used for training a deep learning model to obtain histopathological information from an image of a section of a specimen based on hematoxylin and eosin (H&E) staining, by recognizing specific immunohistochemistry (IHC)-based staining information.

The present disclosure further relates to a deep learning model, such as a convolutional neural network, a recurrent neural network or a general adversarial network, wherein said model is trained to obtain histopathological information from an image of a section of a specimen based on a first staining, by recognizing specific staining information, such as tumor regions, based on a second staining protocol different from the first staining protocol, from the image, wherein said model is trained based on co-registration of a first training image and a second training image, wherein the first and second training images represent adjacent tissue sections stained using the first and second staining protocol respectively. The model may be trained according to the presently disclosed method for training a deep learning model to obtain histopathological information from images.

The present disclosure further relates to systems for the described labelling and training processes. One embodiment of such a system comprises a computer-readable storage device for storing instructions that, when executed by a processor, performs the method for labelling of histopathological images and/or the method for training a deep learning model. The present disclosure further relates to a computer program having instructions which when executed by a computing device or system causes the computing device or system to perform the labelling of histopathological images and/or the method for training a deep learning model.

Adjacent Sectioning

Figure 4:
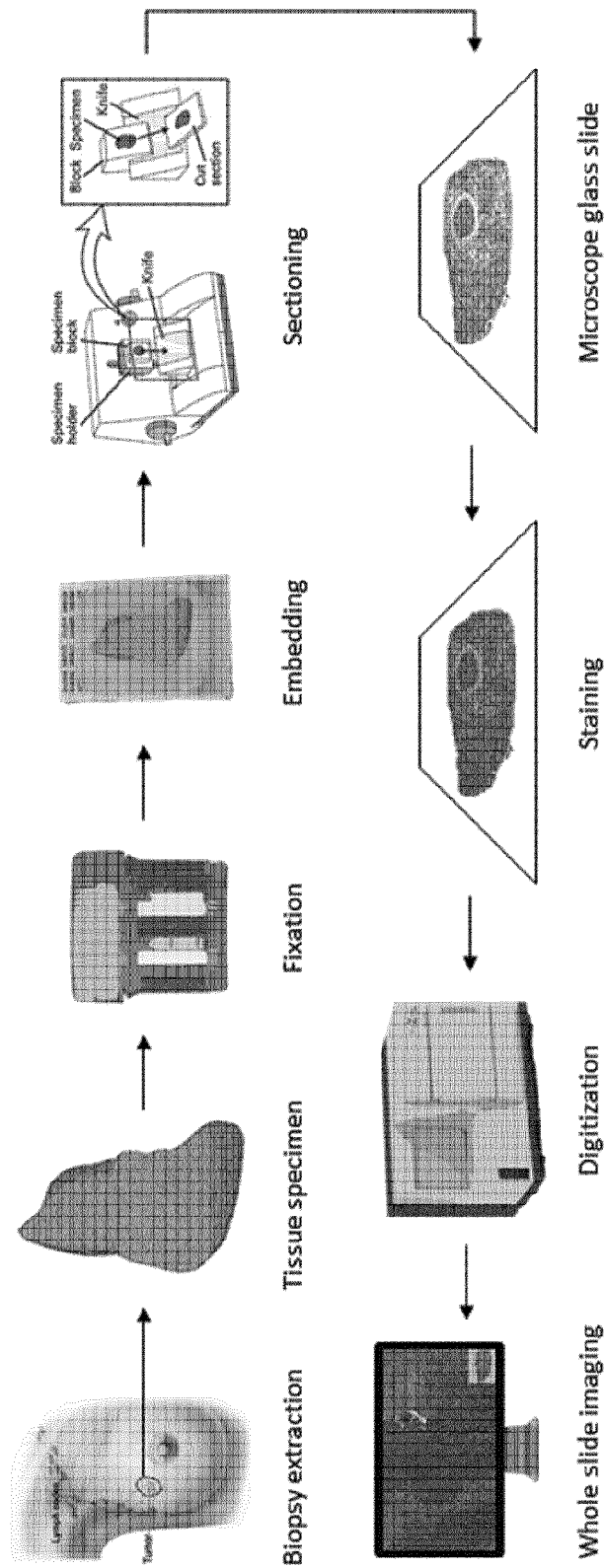
FIG. 4 shows a number of steps in the preparation of images and possible sources of variation in the images that are analyzed.
Figure 5B:
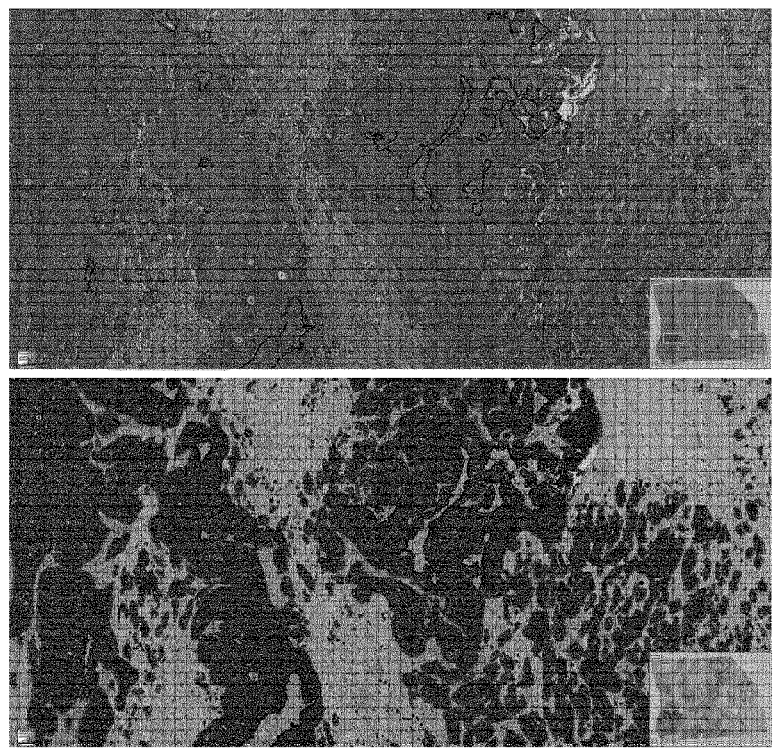

Sectioning of tissue may be performed using any technique and additionally involve any type of tissue processing. Typically, whole tissues are cut into ultrathin sections that are staining using staining protocol and staining markers. This is shown in FIG. 4 and is one of a number of sources of variations in images, making an objective labelling challenging. Specimens are typically sliced at a range of 3 µm-50 µm. In one embodiment of the presently disclosed method for labelling of histopathological images the first and second seconds are thinner than 1 mm. The first and second sections may be ultrathin sections, such as thinner than 100 µm, preferably thinner than 50 µm, more preferably thinner than 10 µm, even more preferably thinner than 5 µm, most preferably thinner than 1 µm. The first and second sections may be referred to as histological slices and the staining of the first and second sections may accordingly be referred to as histological staining. FIG. 5B shows an example of two adjacent tissue sections stained using different staining protocols and annotations for the two adjacent tissue sections. The annotations in this example are lines defining specific regions of the image.

"Adjacent sections of the specimen" refers to the section being sufficiently close for the co-registration step to be meaningful, i.e. that the physical representation of cells etc. is very similar between the sections. It is preferred that the sections are as close as possible to each other. In one embodiment the sections may be neighboring and abutting sections of the specimen, the first and second sections thereby representing a continuous piece of the specimen. In one embodiment the first and second adjacent sections are obtained at a distance of less than 50 µm, preferably less than 20 µm, more preferably less than 10 µm, such as between 3 and 6 µm, even more preferably less than 5 µm, most preferably less than 3 µm. Preferably, the first and second sections are obtained by serial adjacent sectioning of the specimen.

The specimen may be any suitable specimen containing biological cells. Typically, the specimen is either a section of a tissue portion or a sample of fluid comprising cells.

The tissue portion may come from any relevant tissue, and will typically come from tumor tissue or tissue suspected to contain tumor tissue. It may be any tumor, such as typically tumor tissue selected from breast tumor tissue, colon tumor tissue, bladder tumor tissue, kidney tumor tissue, endometrial tumor tissue, lung tumor tissue, melanoma tissue, and prostate tumor.

The specimen may also be a sample of fluid containing cells. The fluid may be a body fluid, such as blood, urine, saliva or cerebrospinal fluid, or the fluid may come from a lavage, such as bronchoalveolar lavage. The fluid may be examined for any type of cells, such as cancer cells.

Staining

Immunohistochemistry (IHC) is an advanced histological staining method that utilizes antibody-antigen specificity to selectively image specific cell components, e.g. proteins. Usually, the antibody is tagged with an enzyme that catalyzes specific coloring, making it possible to capture the signal using a regular bright-field microscope. This method is used in clinical diagnostics and histology research as more and more IHC markers are developed. For example, pan cytokeratin (PCK) is an IHC marker used to detect carcinomas in epithelial tissue creating high contrast between normal and tumor tissue. Some applications use multiple IHC-markers on the same tissue section to obtain complimentary information from two or more IHC-signals. This process is called physical double staining, where overlapping chromogens/signals make precise assessment difficult for image analysis (IA).

In one embodiment of the presently disclosed method for labelling of histopathological images the staining of the first section is immunohistochemistry (IHC). The first section may have been stained using a first marker, which is an immunohistochemistry marker. The marker may be selected from the IHC-family, such as HER2 or cytokeratin (PCK), or CD IHC-family, such as HER2, ER, PR, Ki67, PHH3, CK5, cytokeratines, and CD antigens.

Hematoxylin and eosin (H&E) staining is the most common stain in histopathology and have been used at least for a century to create contrast between various tissue components. It is not as specific as IHC, as it is comprised of two dyes; hematoxylin and eosin. Hematoxylin colors basophilic cell components dark blue or purple (e.g. DNA, RNA etc.), where eosin colors acidophilic components red or pink (e.g. positively charged cytoplasmic proteins etc.). It is considered the gold standard for many diagnostic histopathologic examinations performed on conventional microscopy.

In one embodiment of the presently disclosed method for labelling of histopathological images the staining of the section is hematoxylin and eosin (H&E) staining. The corresponding second marker may thus be a hematoxylin and eosin marker.

Typically the staining is a staining specific for a marker in said specimen, such as a marker for protein expression, for example a protein expression specific for a specific type of cells in the specimen. An example is a staining for a marker associated with the cell membrane. Another example is a staining for the cell nucleus.

For the purpose of transferring the histopathological information for the first section of the first image to the second section of the second image to annotate the second image, the first staining protocol may a more specific and/or more reliable and/or more accurate in some way than the second staining protocol. The first staining does not necessarily have to contain additional information compared to the second staining, but typically the first staining has more clearly recognizable information. The presently disclosed methods for labelling of histopathological images and for training a deep learning model can be said to make use of the fact that the information is present also in the second image but a model needs to be trained by using information from the first image, preferably repeatedly, to be able to interpret the information of the second image.

In one embodiment the first staining protocol is assumed to provide a true labelling, achieved by image analysis, which can be considered to be reliable. The first staining protocol may specify a single staining or a physical double staining.

Co-Registration, Virtual Double Staining

Figure 3:
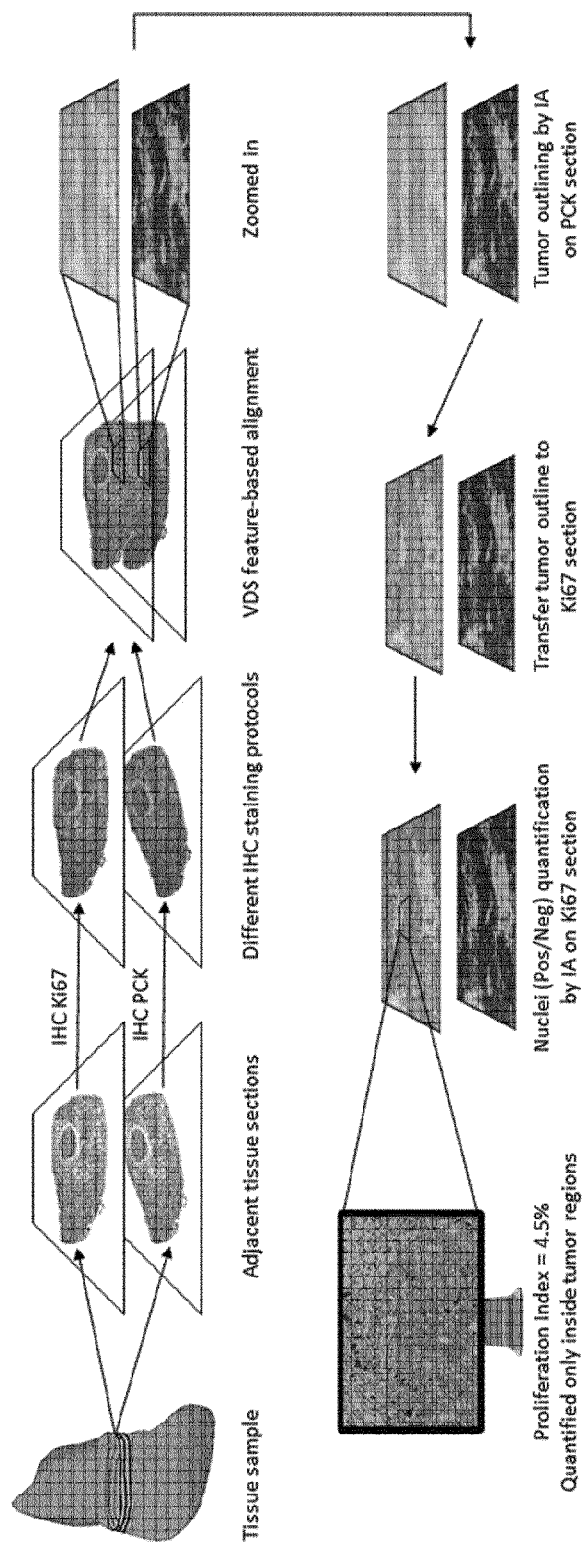
FIG. 3 shows an example of a virtual double staining workflow and co-registration process.

As described above, the presently disclosed method for labelling of histopathological images comprises a co-registration step, wherein the images of the first and second sections are aligned. The co-registration may perform feature-based registration of adjacent tissue sections using multi-scale point-matching and local deformations via thin-plate splines. More precisely, the images of the first and second sections may be aligned on a cellular level. The co-registration can be said to express a transfer map or transfer function for transferring the histopathological information for the first section of the first image to the second section of the second image. FIG. 3 shows an example of a virtual double staining workflow and co-registration process.

In one embodiment of the method, the first and second sections of the images are co-registered using multi-scale point-matching and local deformations.

The co-registration may involve the step of performing a registration process of the two images thereby obtaining a mathematical transformation rule and afterwards using said transformation rule for each image field identified in one image allowing that the corresponding image field in the other image may be identified as well. After the corresponding image pairs have been obtained, the sections can be assessed, such as by identifying the counting events for at least one type of object on the image fields within at least one corresponding image pair, optionally using automatic means.

The feature-based co-registration process may in particular involve a process, in which a superimage of at least part of section A and a superimage of at least part of section B is obtained; The co-registration may comprise a process for obtaining at least one corresponding image pair from at least two adjacent sections A and B of a specimen. Said method comprises the steps of: a correspondence between features of the two related superimages is established; an image field within section A is identified; a corresponding area within section B, said area comprising an image field within section B corresponding to said image field within section A, is identified using a mathematical transformation rule; an image of said image field within section A is acquired and an image of said image field within section B is acquired to obtain a corresponding image pair. The steps may be repeated to obtain additional image pairs.

The co-registration and/or alignment of the images of the first and second sections may be any version of the alignment described in international application PCT/DK2007/050171, "Feature-based registration of sectional images", publication number WO 2008/080403 A1.

Quality Parameters

The method may also involve the calculation of quality parameters for the staining, which may be transferred using the co-registration. In one embodiment, at least a first quality parameter related to the staining of the first section and a second quality parameter related to the staining of the second section are calculated, and the first and second quality parameters are correlated.

The correlation between the first and second quality parameters may be the difference between the first and second quality parameters, or the ratio between the first and second quality parameters.

Obtaining Histopathological Information

The step of obtaining histopathological information according to the present invention is to be construed broadly, mean identification and/or indication of a physical structure or mark in an image. Specifically, the step of obtaining histopathological information for the first section comprises classifying and/or outlining area(s) in the first image. Alternatively, or in combination, the step may comprise nuclei marking and/or outlining of cancerous tumor region(s) and/or outlining mitotic cells. The step of obtaining histopathological information may be achieved by automatic image analysis involving segmentation, classification, detection, recognition, object-based analysis etc. The histopathological information for the first section may comprise the step of labelling and/or annotating the first image—the step of transferring the histopathological information for the first section of the first image to the second section of the second image may thereby involve the step of transferring the labelling and/or annotation from the first image to the second image.

Training a Deep Learning Model, Diagnosing/Classifying Cancer

The present disclosure further relates to a method for training a deep learning model to obtain histopathological information from an image of a section of a specimen based on hematoxylin and eosin (H&E) staining. The method makes use of the fact that histopathological information for diagnosing and/or classifying cancer are present also in hematoxylin and eosin staining but in practice not easily used due to variances and other challenges in the image processing. Techniques have been proposed to improve these techniques, for example by more advanced identification algorithms. In the presently disclosed method for training a deep learning model to obtain histopathological information from an image of a section of a specimen based on hematoxylin and eosin (H&E) staining, it is proposed to train the deep learning model to recognize specific immunohistochemistry (IHC)-based staining information, such as tumor regions, from the image. In the training, hematoxylin and eosin-stained first training images are labelled, preferably automatically using image analysis, according to histopathological information of immunohistochemistry-stained second training images.

Figure 7A:
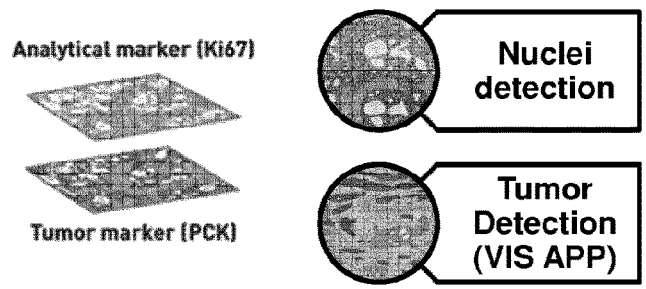
FIG. 7A shows outline of tumor regions on a sample stained by pan cytokeratin (PCK), which is an IHC marker.
Figure 7B:
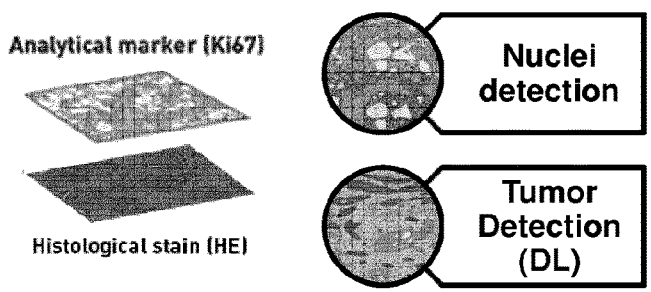
FIG. 7B shows outline of tumor regions on a sample stained by H&E, using an annotation according to the presently disclosed method.
Figure 8:
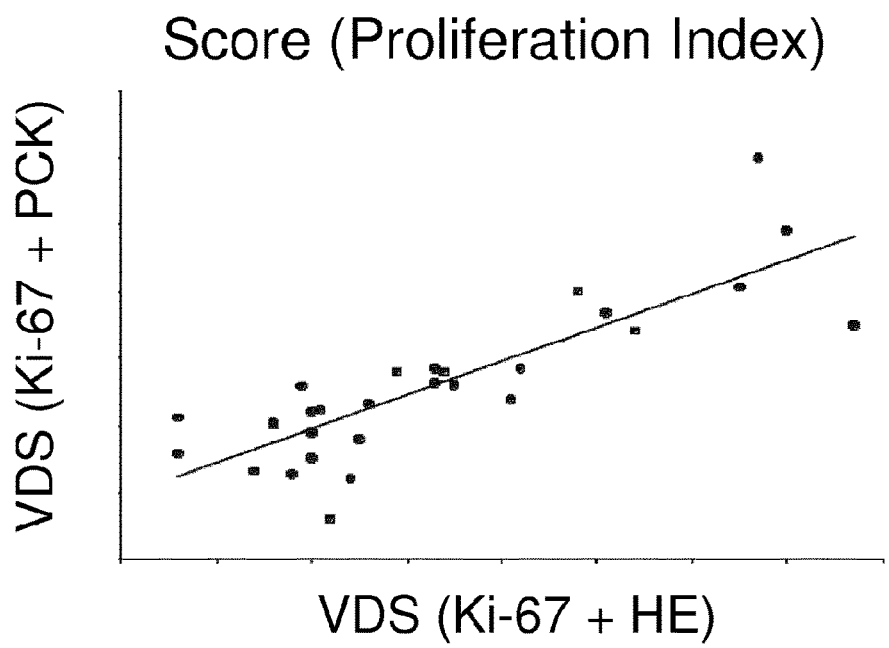
FIG. 8 shows a comparison of proliferation index for a number of PCK stained samples and H&E stained samples annotated according to the presently disclosed method. The Ki-67 protein is a cellular marker for proliferation. The proliferation index is a measure of the number of cells in a tumor that are dividing (proliferating). The diagram shows that it is possible to outline tumor region using hematoxylin and eosin.

The deep learning method is thereby trained to obtain histopathological information from an image of a section of a specimen based on hematoxylin and eosin (H&E) staining, by recognizing specific immunohistochemistry (IHC)-based staining information, such as tumor regions. If a deep learning model is trained to recognize IHC-expressions (e.g. tumor regions, mitotic cells etc.) in H&E-stained tissue samples, the developed algorithms of the model can then be deployed on H&E-stained sections only, without requiring more expensive IHC-stained sections, but nonetheless benefitting of recognizing the IHC-expressions. The training of the deep learning model may be an integrated part of the method for labelling of histopathological images, which may provide histopathological immunohistochemistry (IHC)-based staining information from the first image(s) to the second image(s), which may be image(s) with hematoxylin and eosin (H&E) staining. FIG. 7A shows an outline of tumor regions on a sample stained by pan cytokeratin (PCK), which is an IHC marker. FIG. 7B shows an outline of tumor regions on a sample stained by H&E, using an annotation according to the presently disclosed method. FIG. 8 shows a comparison of a proliferation index for a number of PCK stained samples and H&E stained samples annotated according to the presently disclosed method. The Ki-67 protein is a cellular marker for proliferation. The proliferation index is a measure of the number of cells in a tumor that are dividing (proliferating). The diagram shows that it is possible to outline the tumor region using hematoxylin and eosin.

EXAMPLES

Examples of IHC to H&E Transfer

For breast cancer, the first staining protocol may be a pan cytokeratin (PCK) (AE1, AE3) IHC staining protocol applied to the first section and the second protocol may be a hematoxylin and eosin (H&E) staining protocol applied to the second section PCK is a marker of epithelial tissue in malignant carcinoma. Using the presently disclosed methods for labelling of histopathological images, ground truth label regions with malignant epithelial in the H&E stained section can be obtained and the deep learning model can be trained on the second section only. Hence, when the analysis is developed it may be applied to routine H&E stained section only.

For breast cancer, the first staining protocol may be a phosphohistone H3 (PHH3) IHC staining protocol applied to the first section and the second protocol may be a hematoxylin and eosin (H&E) staining protocol applied to the second section. PHH3 is a mitotic marker and has prognostic capabilities when applied to breast cancer tissue. Using the presently disclosed methods, ground truth label regions with mitotic figures in the H&E stained section can be obtained and the deep learning model can be trained on the second section only. Hence, when the analysis is developed it can be applied to routine H&E stained section only.

For breast cancer, the first staining protocol may be a P63 IHC staining protocol applied to the first section and the second protocol may be a hematoxylin and eosin (H&E) staining protocol applied to the second section. P63 is a marker for ductal carcinoma in situ (DCIS). Using the presently disclosed methods, ground truth label regions with DCIS in the H&E stained section can be obtained and the deep learning model can be trained on the second section only. Hence, when the analysis is developed it can be applied to routine H&E stained section only.

For lymph node metastases, the first staining protocol may be cytokeratin (CK) IHC staining protocol applied to the first section and the second protocol may be a hematoxylin and eosin (H&E) staining protocol applied to the second section. CKs are markers for metastases in lymph nodes, e.g. PCK, CK7/CK19, CAM5.2 etc. Using the presently disclosed methods, ground truth label regions with metastases in the H&E stained section can be obtained and the deep learning model can be trained on the second section only. Hence, when the analysis is developed it can be applied to routine H&E stained section only.

For prostate cancer, the first staining protocol may be HMWCK+P63+AMACR IHC (cocktail) staining protocol applied to the first section and the second protocol may be a hematoxylin and eosin (H&E) staining protocol applied to the second section. HMWCK+P63+AMACR are a marker to discriminate between benign and malign prostate cancer. Using the presently disclosed methods, ground truth label regions with benign and malignant cancer in the H&E stained section can be obtained and the deep learning model can be trained on the second section only. Hence, when the analysis is developed it can be applied to routine H&E stained section only.

For skin cancer, the first staining protocol may be MART1 IHC staining protocol applied to the first section and the second protocol may be a hematoxylin and eosin (H&E) staining protocol applied to the second section. MART1 is a marker for malignant melanoma. Using the presently disclosed methods, ground truth label regions with malignant cancer in the H&E stained section can be obtained and the deep learning model can be trained on the second section only. Hence, when the analysis is developed it can be applied to routine H&E stained section only.

Examples of IHC to IHC Transfer

For breast cancer, the first staining protocol may be an pan cytokeratin (PCK) (AE1,AE3) IHC staining protocol applied to the first section and the second protocol may be a nuclei IHC biomarker staining protocol applied to the second section, e.g. Ki67, ER, PR, HER2. PCK is a marker of epithelial tissue in malignant carcinoma. Using the presently disclosed methods, truth label regions with malignant epithelial in the nuclei biomarker stained section can be obtained and the deep learning model can be trained on the second section only. Hence, when the analysis is developed it can be applied to IHC nuclei stained section only.

Flowchart Example

Figure 1:
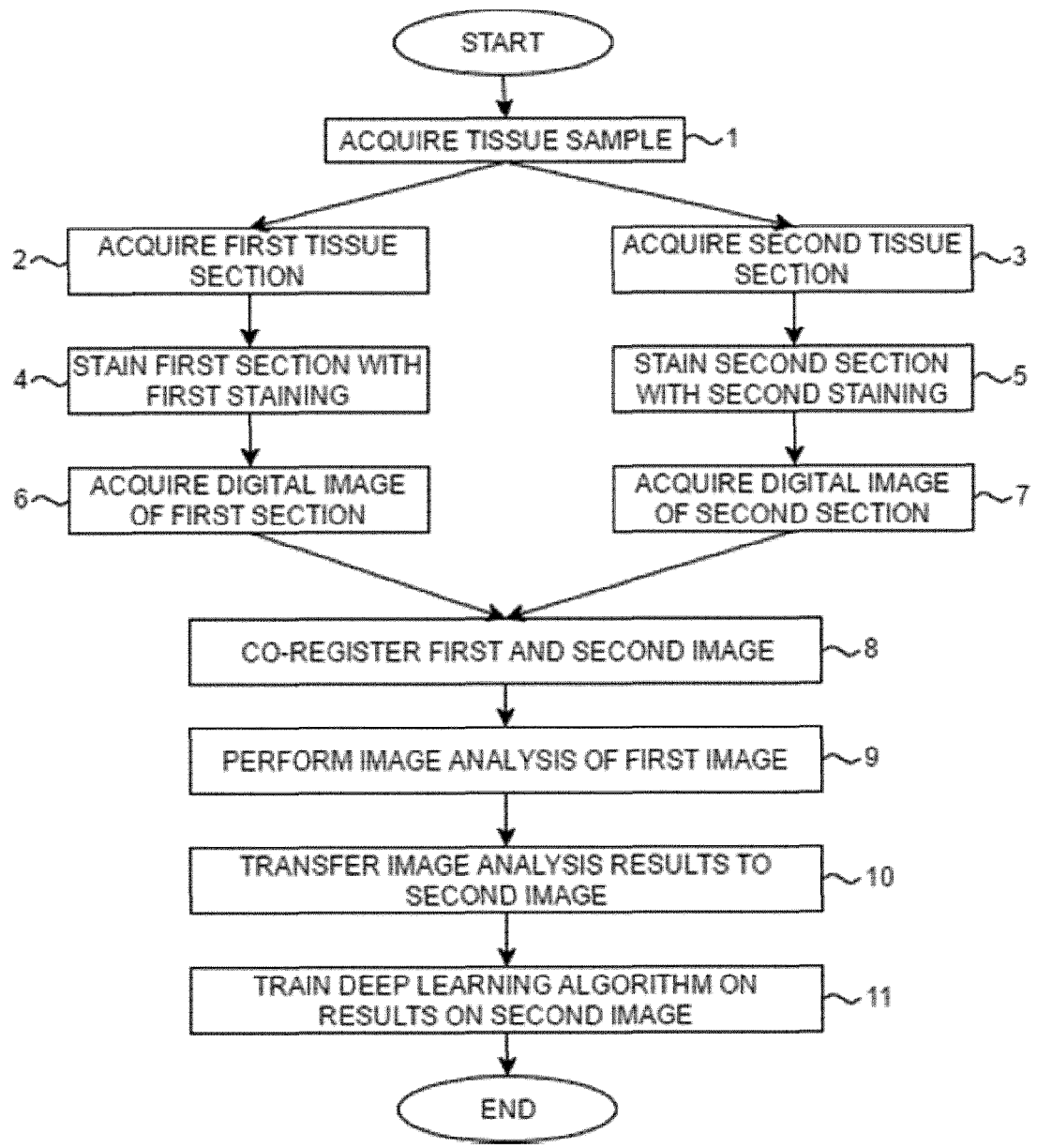
FIG. 1 shows a flowchart of a process for training deep learning algorithms.

FIG. 1 shows a flowchart of a process for training deep learning algorithms. The drawing is exemplary and is intended to illustrate one embodiment of the invention, and is not to be construed as limiting to the presently disclosed invention.

The example illustrates a detailed embodiment for obtaining ground truth annotations from co-registered tissue section with different stains that can be used for supervised training of a deep learning algorithm. In a first step 1, a tissue sample is acquired. In steps 2-3, serial tissue sections are sectioned and transferred to microscopic glass slides. In steps 4-5, the tissue on each glass slide is processed with different staining protocols. In step 4, the first staining protocol could be a specific biomarker. In step 5, the second staining protocol is different from the first staining. The common staining methods used in histology are H&E staining, immunohistochemistry (IHC) and immunofluorescence (IF). For example, in step 4, the first staining protocol could be one or multiple IHC or IF biomarkers and in step 5, the second staining protocol could be an H&E staining. In step, 6-7, each section is digitized using a whole slide scanner, and the digital images are stored in a database. In step 8, the first and second digital image is co-registered. The registering process of the first and second image may be performed by obtaining a mathematical transformation rule and afterwards using said transformation rule to co-register corresponding images such that no or only small spatial distortions between the first image and the second image. In step 9, image analysis algorithms or rule sets processes the first image of the first section. The algorithm depends on the type of the first staining and the objective. The objective of the image analysis may be to detect, segment or classify any information of the first staining. For example, one objective could be to segment tissue compartments in the first image based on IHC biomarkers. In step 10, the image analysis results of the first image are transferred to the co-registered second image. Thereby, biomarker ground truth information of the first staining in the first image is available at the corresponding spatial location in the second image. In step 11, deep learning algorithms can be trained on training annotations from the second image and the corresponding output value of the image analysis results of the first image. The supervised training of the deep learning algorithms may be performed by inputting each training example through the deep learning algorithm and adjusting the weights via an error back-propagation procedure so that the output generated from the deep learning algorithm matches the label associated with the training example. When the deep learning algorithm has been developed, the deployed analysis will only require an image of a tissue section stained with the same protocol as the second staining protocol.

REFERENCE

International application PCT/DK2007/050171, "Feature-based registration of sectional images", publication number WO 2008/080403 A1, is hereby incorporated by reference in its entirety.

Further Details of the Invention

The invention will now be described in further detail with reference to the following items:

1. A method for labelling of histopathological images, the method comprising the steps of:
    providing a first image of a first section of a specimen, such as a tissue portion, wherein the first section has been stained using a first staining protocol;
    providing a second image of a second section of the specimen, the first and second sections being adjacent sections of the specimen, wherein the second section has been stained using a second staining protocol different from the first staining protocol;
    co-registration of the first and second sections of the images;
    obtaining histopathological information for the first section of the first image based on the staining of the first section and the first staining protocol; and
    transferring the histopathological information for the first section of the first image to the second section of the second image based on the co-registration of the first and second sections, thereby labelling the second image according to the histopathological information of the first image.
1. A method for training a deep learning model to obtain histopathological information from images, the method comprising the steps of:
    providing a first image of a first section of a specimen, such as a tissue portion, wherein the first section has been stained using a first staining protocol;
    providing a second image of a second section of the specimen, the first and second sections being adjacent sections of the specimen, wherein the second section has been stained using a second staining protocol different from the first staining protocol;
    co-registration of the first and second sections of the images;
    obtaining histopathological information for the first section of the first image based on the staining of the first section and the first staining protocol;
    transferring the histopathological information for the first section of the first image to the second section of the second image based on the co-registration of the first and second sections, thereby labelling the second image according to the histopathological information of the first image; and
    training a deep learning model, based on the labelling of the second image, to obtain histopathological information from images stained with the second staining protocol.
2. The method according to any of the preceding items, further comprising the step of training a deep learning model based on the labelling of the second image.
3. The method according to any of the preceding items, wherein the deep learning model is trained to recognize expressions, such as tumor regions and/or mitotic cells, associated with the histopathological information of the first section, in images stained with the second staining protocol
4. The method according to any of the preceding items, wherein the training of the deep learning model is based on training annotations associated with the second image, and wherein results of the training annotations are compared against the histopathological information of the second image.
5. The method according to any of the preceding items, wherein the first staining protocol is more specific and/or more reliable than the second staining protocol.
6. The method according to any of the preceding items, wherein the first staining protocol is assumed to provide a true labelling.
7. The method according to any of the preceding items, wherein the deep learning model is trained to recognize specific immunohistochemistry information in hematoxylin and eosin stained images.
8. The method according to any of the preceding items, wherein the first staining protocol provides additional or different information than the second staining protocol
9. The method according to any of the preceding items, wherein the staining of the first section is selected from the group of immunohistochemistry (IHC) and immunofluorescence (IF), and the staining of the second section is hematoxylin and eosin (H&E).
10. The method according to any of the preceding items, wherein the labelled second images, in a further step, are used for training a deep learning model to obtain histopathological information from an image of a section of a specimen based on hematoxylin and eosin (H&E) staining, by recognizing specific immunohistochemistry (IHC)-based staining information.
11. The method according to any of the preceding items, wherein the labelled second images, in a further step, are used for training a deep learning model to obtain histopathological information from an image of a section of a specimen based on hematoxylin and eosin (H&E) staining, by recognizing specific immunofluorescence (IF)-based staining information.
12. The method according to any of the preceding items, wherein the first section has been stained using a first marker, and wherein the second section has been stained using a second marker, wherein the first marker is an immunohistochemistry marker and the second marker is a hematoxylin and eosin marker.
13. The method according to any of the preceding items, wherein the labelling is ground truth labelling and the obtained second image is ground truth labelled.
14. The method according to any of the preceding items, wherein the first and second sections are ultrathin sections, such as thinner than 100 μm, preferably thinner than 50 μm, more preferably thinner than 10 μm, even more preferably thinner than 5 μm, most preferably thinner than 1 μm.
15. The method according to any of the preceding items, wherein the first and second sections are histological slices and the staining of the first and second sections is histological staining.
16. The method according to any of the preceding items, wherein the first and second adjacent sections are obtained at a distance of less than 50 μm, preferably less than 20 μm, more preferably less than 10 μm, such as between 3 and 6 μm, even more preferably less than 5 μm, most preferably less than 3 μm.
17. The method according to any of the preceding items, wherein the first and second sections are obtained by serial adjacent sectioning of the specimen.
18. The method according to any of the preceding items, wherein the first and second sections represent a continuous piece of the specimen.
19. The method according to any of the preceding items, wherein the specimen is a section of a tissue portion comprising cells or a sample of fluid comprising cells.
20. The method according to item 19, wherein the tissue is tumor tissue, such as tumor tissue selected from breast tumor tissue, colon tumor tissue, bladder tumor tissue, kidney tumor tissue, endometrial tumor tissue, lung tumor tissue, melanoma tissue, and prostate tumor.

21. The method according to any of items 1-18, wherein the specimen is sample of fluid, such as a body fluid sample, comprising cells.

22. The method according to any of the preceding items, wherein the staining of the first and second sections is a staining specific for a marker in said specimen, such as a marker for protein expression.

23. The method according to item 22, wherein the marker is associated with a membrane or the marker is associated with a cell nucleus.

24. The method according to any of the preceding items, wherein the first staining protocol specifies a single staining or a physical double staining.

25. The method according to any of the preceding items, wherein first marker corresponding to the first staining protocol is selected from the IHC-family, such as HER2 or cytokeratin (PCK), or CD IHC-family, such as HER2, ER, PR, Ki67, PHH3, CK5, cytokeratines, and CD antigens.

26. The method according to any of the preceding items, wherein the first and second sections of the images are aligned on a cellular level using feature-based co-registration techniques.

27. The method according to any of the preceding items, wherein the first and second sections of the images are aligned using multi-scale point-matching and local deformations.

28. The method according to any of the preceding items, wherein at least a first quality parameter related to the staining of the first section and a second quality parameter related to the staining of the second section are calculated, and the first and second quality parameters are correlated.

29. The method according to item 28, wherein the correlation between the first and second quality parameters is the difference between the first and second quality parameters, or wherein the correlation between the first and second quality parameters is the ratio between the first and second quality parameters.

30. The method according to any of the preceding items, wherein the step of obtaining histopathological information for the first section comprises classifying and/or outlining area(s) in the first image.

31. The method according to item 30, comprising the step of nuclei marking and/or outlining of cancerous tumor region(s) and/or outlining mitotic cells.

32. The method according to any of the preceding items, wherein the step of obtaining histopathological information for the first section comprises the step of labelling and/or annotating the first image.

33. The method according to item 32, wherein the step of transferring the histopathological information for the first section of the first image to the second section of the second image comprises the step of transferring the labelling and/or annotation from the first image to the second image.

34. The method according to any of the preceding items, wherein the first and second images are obtained from existing data, such as images from a clinical center.

35. The method according to any of the preceding items, wherein the steps are integrated in existing staining and analysis processes.

36. The method according to any of the preceding items, further comprising the step of training a model based on the obtained labelled images.

37. The method according to item 36 using a deep learning model, such as convolutional neural networks (CNN), recurrent neural networks (RNN) or general adversarial networks (GAN).

38. The method according to any of the preceding items, further comprising the step of serial adjacent sectioning to obtain the first and second sections.

39. The method according to any of the preceding items, further comprising the step of staining the first and second sections.

40. The method according to any of the preceding items, wherein the steps are repeated on a number of specimens, thereby generating a database of ground truth annotated datasets, the method preferably further comprising the step of using the annotated data sets for training a deep learning model to obtain histopathological information from an image of a section of a specimen based on hematoxylin and eosin (H&E) staining, by recognizing specific immunohistochemistry (IHC)-based staining information.

41. A method for training a deep learning model, such as a convolutional neural network, a recurrent neural network or a general adversarial network, to obtain histopathological information from an image of a section of a specimen based on a first staining, by recognizing specific staining information, such as tumor regions, based on a second staining protocol different from the first staining protocol, from the image, wherein said training is based on co-registration of a first training image and a second training image, wherein the first and second training images represent adjacent tissue sections stained using the first and second staining protocol respectively.

42. The method for training a deep learning model according to item 41, wherein the model is trained to obtain the histopathological information by recognizing specific immunohistochemistry (IHC)-based or immunofluorescence (IF)-based staining information from the image, and wherein said training is based on a hematoxylin and eosin-stained first training image and a second immunohistochemistry-stained or immunofluorescence-stained training image.

43. The method for training a deep learning model according to any of items 41-42, wherein the hematoxylin and eosin-stained first training image is obtained using the method according to any of items 1-40.

44. The method for training a deep learning model according to any of items 41-43, comprising the step of training the deep learning model to recognize an immunohistochemistry specific expression in an image of a specimen which has been stained using hematoxylin and eosin staining.

45. A method for diagnosing and/or classifying cancer from an image of a section of a specimen based on hematoxylin and eosin (H&E) staining based on a deep learning model obtained from the method according to any of items 41-44.

46. The method according to item 45, wherein the cancer is breast cancer, gastric cancer, cervical cancer, kidney cancer, lung cancer, skin cancer or colon cancer.

47. The method according to any of items 45-46, comprising the step of classifying and/or outlining area(s) in the image and/or nuclei marking and/or outlining of cancerous tumor region(s) and/or outlining mitotic cells.

48. A system for labelling of histopathological images, comprising a computer-readable storage device for storing instructions that, when executed by a processor, performs the method for labelling of histopathological images according to any of items 1-40.

49. A system for diagnosing and/or classifying cancer from an image of a section of a specimen based on hematoxylin and eosin (H&E) staining, said system comprising a computer-readable storage device for storing instructions that, when executed by a processor, performs the method for diagnosing and/or classifying cancer according to any of items 45-47.

50. A computer program having instructions which when executed by a computing device or system causes the computing device or system to perform the labelling of histopathological images according to any of items 1-40.

The invention claimed is:

1. A method for supervised training a deep learning model to obtain histopathological information from images, the method comprising the steps of:
providing a first image of a first section of a specimen, wherein the first section has been stained using a first staining protocol, wherein the staining of the first section is selected from the group of immunohistochemistry (IHC) and immunofluorescence (IF);
providing a second image of a second section of the specimen, the first and second sections being adjacent sections of the specimen, wherein the second section has been stained using a second staining protocol different from the first staining protocol;
co-registration of the first and second sections of the images, wherein a transfer map or transfer function expresses an alignment of the first section of the first image and the second section of the second image;
obtaining histopathological information for the first section of the first image, the step of obtaining histopathological information comprising automatic image analysis and automatic labelling and/or annotation of the first image based on the staining of the first section and the first staining protocol;
transferring the histopathological information for the first section of the first image to the second image based on the co-registration of the first and second sections, thereby automatically labelling and/or annotating the second image according to the histopathological information of the first image, the histopathological information comprising labelling and/or annotation of the first image, and according to the transfer map or transfer function; and
training a deep learning model, based on the automatically transferred labelling and/or annotation of the second image, to obtain histopathological information from images stained with the second staining protocol wherein the supervised training of the deep learning model comprises the step of comparing training annotations associated with the second image against the automatically transferred histopathological information.

2. The method according to claim 1, wherein the deep learning model is trained to recognize expressions associated with the histopathological information of the first section, in images stained with the second staining protocol.

3. The method according to claim 1, wherein the deep learning model is trained to recognize specific immunohistochemistry information in hematoxylin and eosin stained images.

4. The method according to claim 1, wherein the first staining protocol is more specific and/or more reliable than the second staining protocol.

5. The method according to claim 1, wherein the first staining protocol provides additional or different information than the second staining protocol.

6. The method according to claim 1, wherein the first staining protocol is assumed to provide a true labelling.

7. The method according to claim 1, wherein the labelled second images, in a further step, are used for training a deep learning model to obtain histopathological information from an image of a section of a specimen based on hematoxylin and eosin (H&E) staining, by recognizing specific immunohistochemistry (IHC)-based staining information.

8. The method according to claim 1, wherein the labelled second images, in a further step, are used for training a deep learning model to obtain histopathological information from an image of a section of a specimen based on hematoxylin and eosin (H&E) staining, by recognizing specific immunofluorescence (IF)-based staining information.

9. The method according to claim 1, wherein the first and second adjacent sections are obtained at a distance of less than 50 µm, or less than 20 µm, or less than 10 µm or less than 5 µm, or less than 3 µm.

10. The method according to claim 1, wherein the first and second sections of the images are aligned on a cellular level using feature-based co-registration techniques.

11. The method according to claim 1, wherein the first and second sections of the images are aligned using multi-scale point-matching and local deformations.

12. A system for training a deep learning model, comprising a computer-readable storage device for storing instructions that, when executed by a processor, performs the method for training a supervised deep learning model to obtain histopathological information from images according to claim 1.

* * * * *